(No Model.)
J. D. TRACY & J. F. PLATT.
CORNSTALK SHREDDER AND SNAPPING MACHINE.
No. 571,057. Patented Nov. 10, 1896.
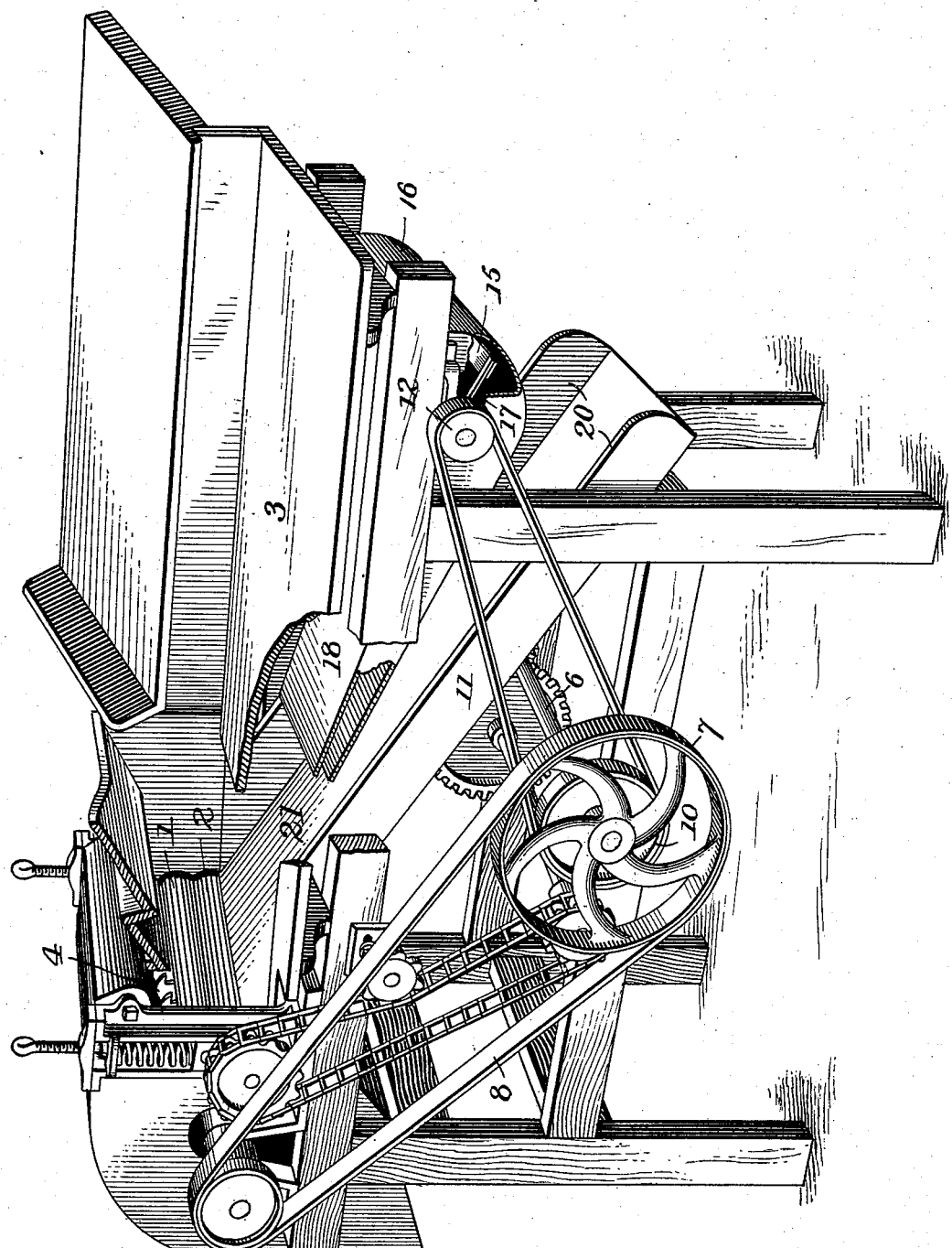

UNITED STATES PATENT OFFICE.

JOHN D. TRACY AND JAMES F. PLATT, OF STERLING, ILLINOIS.

CORNSTALK-SHREDDER AND SNAPPING-MACHINE.

SPECIFICATION forming part of Letters Patent No. 571,057, dated November 10, 1896.

Application filed December 26, 1895. Serial No. 573,337. (No model.)

*To all whom it may concern:*

Be it known that we, JOHN D. TRACY and JAMES F. PLATT, citizens of the United States, residing at Sterling, in the county of Whiteside and State of Illinois, have invented certain new and useful Improvements in Cornstalk-Shredders and Snapping-Machines, of which the following is a specification.

This invention relates to corn-snapping machines; and it consists, substantially, of such features of improvement as will hereinafter be more particularly described. Considerable difficulty and inconvenience have been experienced with machines of this kind heretofore, due to the fact that as the ears of corn are snapped off or severed from the cornstalks considerable quantities of loose pieces of stalk, husks, and other particles are carried with the corn-ears, so that it becomes necessary subsequently to separate such materials from the corn-ears previous to the cribbing or preparation of the latter for marketable purposes. This same difficulty is met with both in machines wherein the corn-ears are simply snapped off or severed from the stalks as well as in those machines wherein the stalks are carried through the snapping-rolls and delivered to the action of shredding or cutting knives by which to cut up the stalks, in a manner and for a purpose that is clearly obvious to those acquainted with this class of machines.

Some attention has been given to correction or improvement of the machines by which the loose husks and other similar foreign substances are separated in the dropping of the corn-ears from the snapping-rolls to the receptacle into which the said ears are caused to fall. One construction has usually comprised a pair of ordinary snapping-rolls, together with an ordinary fan, which delivered a blast of air across the path of the falling corn-ears, so that the loose husks and other material was carried forwardly of the machine and caused to become mixed or carried off, together with the cornstalks, which were subjected to the ordinary shredding operation by a suitable arrangement of concave and shredding rolls. The construction referred to has not been found to meet all of the requirements incident to the uses of these machines, inasmuch as a special construction of machinery is required, and the expense of the machine was, of course, thereby materially increased.

The object of the present invention is to overcome all of the disadvantages above enumerated and to provide a machine of this character in which all of the loose material from the stalks will be caused to pass through the snapping-rolls, while at the same time the corn-ears will be deposited onto a suitable chute and will thence gravitate to a suitable receiver or elevator, all ready for marketable purposes, without subsequent separation or cleaning, substantially as will hereinafter more fully appear when taken in connection with the accompanying drawing, in which the figure represents a perspective view of a corn-snapping machine embodying the features of our invention.

While our present invention may be varied in its general features of construction, it will of course be understood that the ordinary snapping-rolls 1 and 2 are employed, each being provided with independent driving mechanism and the two being made to rotate in the same direction, so that the cornstalks fed to the rolls on the feed-table 3 will be carried through said rolls and delivered to the shredding devices 4 in a manner well known in this class of machines. As shown herein, the driving mechanism for the lower snapping-roll alone is represented, but it is obvious that similar driving mechanism for the upper roll is employed on the opposite side of the machine and operated from the main feed driving-shaft by similar gearing, such as is shown in connection with the lower roll, as represented in the figure.

6 represents the main feed driving-shaft, carrying at its extreme outer end the drive-pulley 7, and connecting by means of the band or belt 8 with a smaller pulley carried by the end of the shaft of the shredding blades or devices 4, the shredder-cylinder being made to rotate in the direction of the snapping-rolls, by which to immediately begin effective operation upon the cornstalks as they are caused to be passed through or between said rolls. The said feed drive-shaft also carries a smaller drive-pulley 10, connecting by means of a band or belt 11 with a still smaller pulley 12, carried on the corresponding end of the shaft of a fan or blower 15, which revolves or rotates within a fan-case 16, the latter having the usual openings 17 in its ends or sides, and provided with a spout or conduit 18, delivering the air-blast to the snapping-rolls in a slightly-oblique direction from beneath. It is obvious that other means may be devised or employed for delivering an air-blast at this particular point, but we have found the construction such as we have illustrated and described to fully answer the purpose, and in view of the further fact that the same is simple and cheaply made we have found it desirable over and above other constructions. The disposition of the fan or blower is such that the forward end of the spout or conduit 18 thereof may rest either upon the upper edges of the sides 20 of the chute 21 or else the same may be elevated above the sides of the chute, and as this latter arrangement is the construction generally employed we have so represented it in the accompanying drawing.

It will be seen that as the fan or blower is operated from the main feed drive-shaft a blast will be delivered obliquely to the snapping-rolls, and any loose material, such as husks and small pieces of cornstalks, instead of falling upon the chute and being carried down with the ears of corn, will be held closely to the under side of the stalks by the force of the blast of air, and consequently all such particles will be carried through or between the snapping-rolls with the stalks and will be acted upon by the shredding devices in like manner as are the stalks. The advantages of this will be apparent, since no subsequent separation is necessary, much time is saved, and the operation of the machine is considerably expedited and stoppages for separating the trash from corn are not necessary.

Located above the fan at a suitable height and arranged in a horizontal position is the ordinary or well-known feed-table onto which the cornstalks are laid while laden with the ears, and as the said stalks are caused to be fed to the rolls the ears are snapped off, and the stalks being thus relieved of the corn-ears continue to pass through the rolls to the shredding devices, while the said ears drop onto the inclined chute and are delivered to any suitable receptacle for the purpose.

As before stated, such of the material as becomes loosened and separates from the stalk and corn-ears, and which would naturally be precipitated with the ears of corn, are blown up against the cornstalks and there held by the air-blast in such manner as to be carried through the rolls in the manner and for the purpose hereinbefore stated.

It will be understood that the air-blast is of sufficient strength or force to carry the loose material or particles upward in the manner stated, while at the same time not being of force sufficient to prevent the ears of corn from dropping through the blast and onto the delivery-chute.

It will be understood that we are not limited to the precise construction of the fan or blower, and possibly it may be found equally advantageous to direct the blast through the ordinary rolls in a direction substantially parallel with the feed of the cornstalks, and it will therefore be understood that this latter arrangement is to be included within our invention. We have found, however, that by directing the blast to the rolls at a slight angle from beneath, or, more properly speaking, in a direction oblique to the direction of the feed of the stalks, much better results have been attained.

It will further be understood that separate or independent means may be employed for operating the fan, but of course as a simple means or embodiment it is far preferable that the said fan should be operated directly from some moving or driving part of the machine, and therefore we have thus illustrated the same in the accompanying drawing.

It is very common to employ air-blasts in many machines for driving off lighter particles of materials or substances, while the heavier are allowed to precipitate or fall beneath to some suitable receptacle, such, for instance, in many forms of ore separating or crushing machines, threshing-machines, and grain-separators, but it will be understood that this invention is for an altogether different purpose, since, in addition to preventing an admixture of dust and dirt or loose particles with the corn-ears, all of such loose particles or husks or similar materials are caused to be passed through or between the rolls and subjected to the action of the shredding devices in the manner and for the purpose already stated, and all of which being accomplished without any special alteration or construction of machine.

The fan and its case can be applied to machines already in use, and when properly adjusted, so as to cause the blast to be delivered at the proper point, the efficiency of the device is indeed very great. In order to suit different requirements incident to the use of the machine, and also to adapt the machines to the treatment of various sizes of cornstalks, it may be desirable to render the fan or blower of a construction by which the spout or conduit of the same can be brought to varying points of inclination or obliquity with respect to the feed-table, and consequently all of such changes are intended to be included also within our invention.

What we claim is—

1. The combination in a snapping-machine, of a feed table or guide, a pair of snapping-rolls, and an air-conduit arranged to direct a blast of air in the direction of the travel of the cornstalks toward the rolls to thereby carry the leaves and other loose material to said rolls, substantially as shown and for the purpose set forth.

2. The combination in a snapping-machine, of a feed table or guide, a pair of snapping-rolls, an inclined chute leading downward from said rolls, and a blower or fan located beneath said feed-table and above the chute and provided with a spout or conduit inclined upwardly and pointing toward or in the direction of said rolls, substantially as described.

In testimony whereof we have signed our names to this specification in the presence of two subscribing witnesses.

JOHN D. TRACY.
JAMES F. PLATT.

Witnesses:
JAS. A. BUYERS,
SAM J. HARVEY.